United States Patent
Panelli

[15] 3,652,112
[45] Mar. 28, 1972

[54] LOCKING DEVICE FOR A HINGED WINDOW IN A MOTOR VEHICLE

[72] Inventor: Pio Panelli, Pino Torinese, Italy
[73] Assignee: FIAT Societa per Axioni, Turin, Italy
[22] Filed: June 16, 1970
[21] Appl. No.: 46,668

[52] U.S. Cl. .......................... 292/210, 292/241, 292/DIG. 6
[51] Int. Cl. .......................................................... E05c 3/14
[58] Field of Search ............... 292/241, 359, 242, 210, 209, 292/DIG. 6, DIG. 30

[56] References Cited

UNITED STATES PATENTS

| | | | |
|---|---|---|---|
| 2,837,362 | 6/1958 | Meyer | 292/207 |
| 983,432 | 2/1911 | Frederick | 292/210 X |
| 2,196,478 | 4/1940 | Simpson | 292/210 |

FOREIGN PATENTS OR APPLICATIONS

| 1,152,420 | 9/1957 | France | 292/359 |
|---|---|---|---|

*Primary Examiner*—Richard E. Moore
*Attorney*—Sughrue, Rothwell, Mion, Zinn & Macpeak

[57] ABSTRACT

A hinged vehicle window has a rotatably mounted handle with an extension adapted to engage in a detent on the window frame. A locking device holds the handle in its closed position, and comprises a trigger lever mounted in the handle and having an arm that acts as a latch and engages in a groove in the pivot, and a spring biasing the trigger lever into the latching position. The trigger lever also has an actuating arm that is gripped by the operator when opening the window to release the latch arm from the pivot.

2 Claims, 5 Drawing Figures

PATENTED MAR 28 1972 3,652,112

LOCKING DEVICE FOR A HINGED WINDOW IN A MOTOR VEHICLE

The invention deals with the locking of a hinged window in its frame in the passenger compartment of a motor vehicle.

More particularly, the invention concerns a hinged window having a pivotally mounted handle by means of which the window is opened and closed, the handle cooperating with a fixed detent on the frame for locking the window when it is closed.

An object of the invention is to provide a locking device of the above-mentioned type which is simple, tough and inexpensive, which is easy to operate, and which effectively resists tampering and attempts to open the window from the outside.

A further object is to provide a locking device of the above-mentioned type which is free from protruding parts, with a view to improving safety in the passenger compartment in the case of a sudden impact.

The invention provides a hinged window mounted in a frame in a motor vehicle, the frame having a detent formed on it and the window having a pivot fixed on it and a handle rotatably secured on the pivot, the handle having an extension that, when the window is closed, may be engaged in the detent by rotating the handle into a closed position, and a locking device to lock the handle releasably against rotation in its closed position, the improvement that the locking device comprises a trigger lever mounted in a groove in the handle for rocking movement, the trigger lever having a latch arm adapted to engage in a recess in the pivot in the closed position of the handle to prevent rotation of the handle, the trigger lever also having an actuating arm adapted to be moved manually to release the latch arm from the recess in the pivot, and including spring means biasing the trigger lever to a position in which the latch arm tends to enter the recess in the pivot.

Further objects and advantages of the invention will be understood from the following description, referring to the accompanying drawings, in which.

Figure 1:
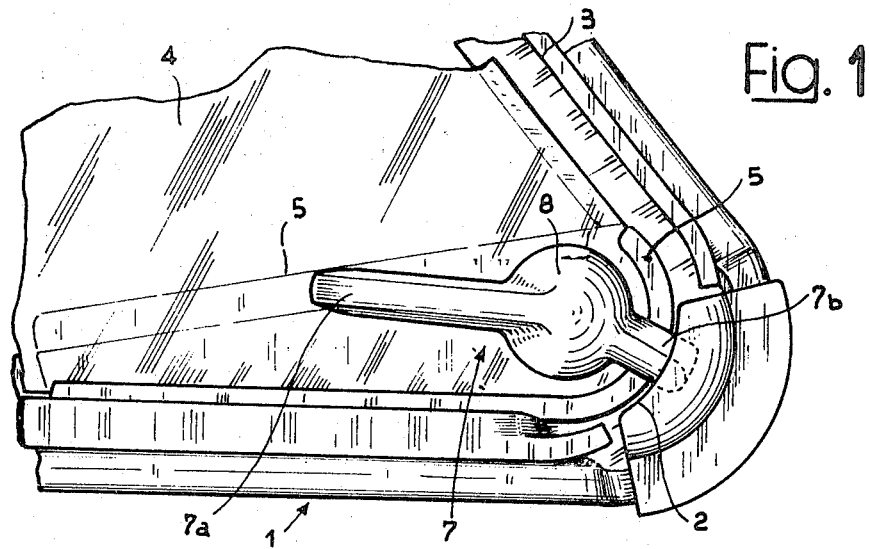
FIG. 1 is a side elevation view of a portion of a hinged window in a motor vehicle, the window having an operating handle that is shown in its closed position.

A frame 1 is secured to a vehicle body and has a fixed detent 2 in the form of a curved lug extending into the passenger compartment, the frame having a seal 3 around its periphery.

A window 4 is hinged in a known manner in the frame 1 and is provided at its lower edge with a metal reinforcement 5. A pivot 6 is secured to the window 4, extending normally from the inner face of window 4 into the passenger compartment.

A handle 7 is rotatably mounted on the pivot 6 and comprises a hollow hub 8 rotatably engaged on the pivot 6, an elongated main extension 7a acting as a grip, and an opposed shorter extension 7b adapted to cooperate with the detent 2 in order to lock the window.

The handle 7 is held against axial movement on the pivot 6 by means of a screw 9 which passes through the wall of the hub portion 8 and extends into a circumferential groove 10 in the pivot 6. The screw 9 does not hinder rotation of the handle 7 on the pivot 6.

In its main extension 7a and hub portion 8 the handle 7 has a longitudinal groove 11 that is open on the side facing the window 4. The groove 11 has a shaped projection 12, spaced away from the pivot 6, and receives a trigger-shaped swing lever 13 with a notch 14 into which the shaped projection 12 extends to act as a fulcrum for the rocking movement of the trigger lever 13.

The trigger lever 13 has an elongated actuating arm 13a which projects out of the groove 11 and is actuated manually in order to release the handle, and a shorter biasing arm 13b having a bulge 15 on which a biasing spring 16 bears, the spring 16 being accommodated in an axial bore 17 in the pivot 6.

The trigger lever 13 has a central locking arm 18 opposite the notch 14, designed to fit into a longitudinal groove 19 in the pivot 6 in order to hold the handle against rotation when the handle is in its closed position, as shown in FIG. 1.

The pivot 6 is further provided at its end with an arcuate projection 21 which cooperates with a shaped portion of the inner surface of the handle hub 8 in order to limit the angle of rotation of the handle.

When the window 4 has been closed, the handle 7 is rotated about its pivot 6 until the short extension 7b enters the detent 2. The locking arm 18 of the trigger lever 13 is then aligned with the groove 19 in the pivot and under the action of the spring 16 snaps into that groove, locking the handle against rotation.

Figure 2:
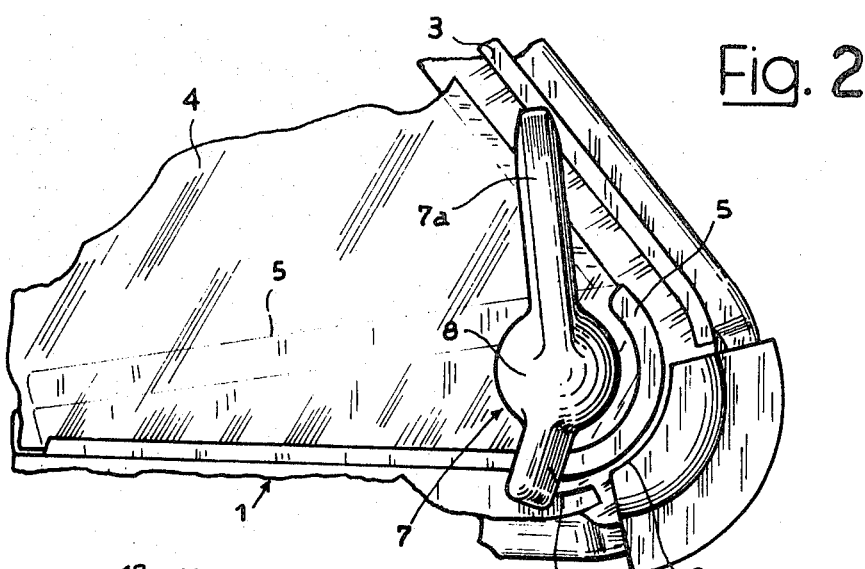
FIG. 2 is a view similar to FIG. 1, showing the handle in its released position.
Figure 4:
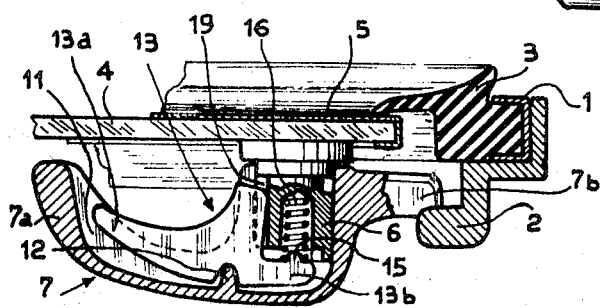
FIG. 4 is a longitudinal sectioned view along the line IV—IV in FIG. 3.
Figure 3:
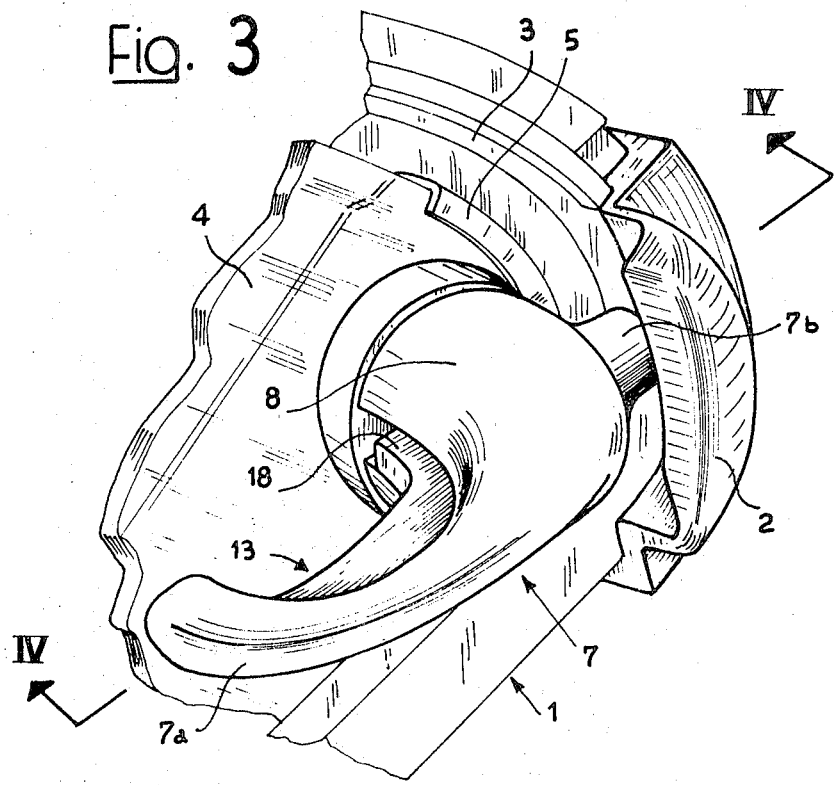
FIG. 3 is a perspective view of the structure of FIGS. 1 and 2, showing the handle in its closed position.
Figure 5:
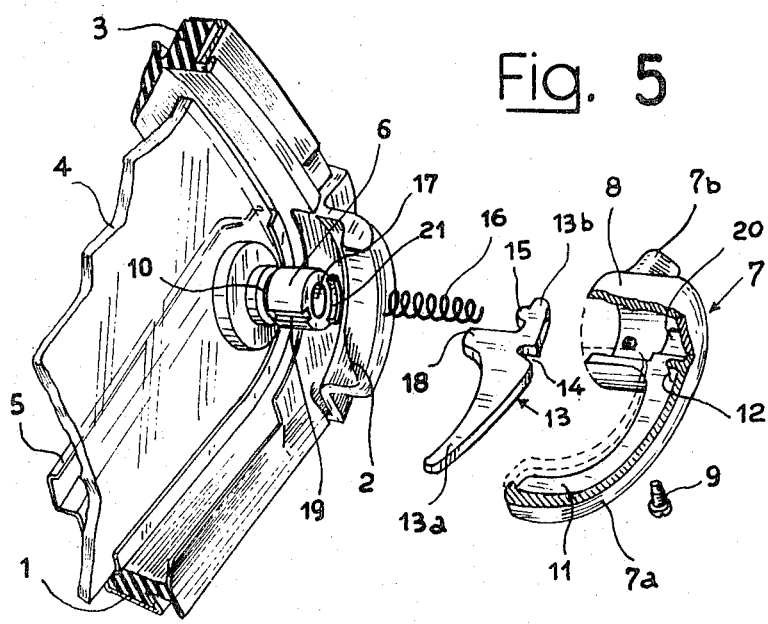
FIG. 5 is an exploded perspective view, partly sectioned, of the structure of FIGS. 1 to 4.

When the handle 7 is gripped in order to rotate it from its locked position shown in FIG. 1 to its released position shown in FIG. 2, the same finger as acts on the handle moves the actuating arm 13a of the trigger lever 13 further into the groove 11, against the resistance of the spring 16, to release the locking arm 18 from the groove 19. The handle can then be rotated about its pivot 6 to its released position, and the window can then be opened.

Operation of the locking device is simplified as the handle can easily be operated by one or two fingers of one hand.

Moreover, protruding parts which might prove dangerous in the case of accidents are avoided.

I claim:

1. In a hinged window mounted in a frame in a motor vehicle, the frame having a detent formed on it and the window having a pivot fixed on it and a handle rotatably secured on the pivot, the handle having an extension that, when the window is closed, may be engaged in the detent by rotating the handle into a closed position, and a locking device to lock the handle releasably against rotation in its closed position, the improvement that the locking device comprises a trigger lever mounted in a groove in the handle for rocking movement, the trigger lever having a latch arm adapted to engage in a recess in the pivot in the closed position of the handle to prevent rotation of the handle, the trigger lever also having an actuating arm adapted to be moved manually to release the latch arm from the recess in the pivot, and including spring means biasing the trigger lever to a position in which the latch arm tends to enter the recess in the pivot, said trigger lever being mounted for rocking movement about a fulcrum formed by a projection in the groove in the handle, the fulcrum being spaced away from the pivot, and including a biasing arm on the trigger lever extending to the pivot, the spring means being a spring mounted in a seat in the pivot and bearing on the biasing arm of the trigger lever.

2. In a hinged window mounted in a frame in a motor vehicle, the frame having a detent formed on it and the window having a pivot fixed on it and a handle rotatably secured on the pivot, the handle having an extension that, when the window is closed, may be engaged in the detent by rotating the handle into a closed position, and a locking device to lock the handle releasably against rotation in its closed position, the improvement that the locking device comprises a trigger lever mounted in a groove in the handle for rocking movement, the trigger lever having a latch arm adapted to engage in a recess in the pivot in the closed position of the handle to prevent rotation of the handle, the trigger lever also having an actuating arm adapted to be moved manually to release the latch arm from the recess in the pivot, and including spring means biasing the trigger lever to a position in which the latch arm tends to enter the recess in the pivot, said groove in the handle containing the trigger lever being open towards the window and extending along a grip portion of the handle, the actuating arm of the trigger lever projecting from the groove.

* * * * *

UNITED STATES PATENT OFFICE
CERTIFICATE OF CORRECTION

Patent No. 3,652,112        Dated March 28, 1972

Inventor(s) Pio PANELLI

It is certified that error appears in the above-identified patent and that said Letters Patent are hereby corrected as shown below:

In The Heading:

The claim of Priority was omitted:

should read:

--Foreign Application Priority Data

June 17, 1969     Italy ............. 52264-A/69--

Signed and sealed this 10th day of October 1972.

(SEAL)
Attest:

EDWARD M. FLETCHER, JR.            ROBERT GOTTSCHALK
Attesting Officer                  Commissioner of Patents